United States Patent
Maguire

(10) Patent No.: US 10,312,490 B2
(45) Date of Patent: Jun. 4, 2019

(54) VENT DEVICES FOR ELECTRIFIED VEHICLE BATTERY PACKS

(71) Applicant: FORD GLOBAL TECHNOLOGIES, LLC

(72) Inventor: Patrick Daniel Maguire, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 192 days.

(21) Appl. No.: 15/090,668

(22) Filed: Apr. 5, 2016

(65) Prior Publication Data

US 2017/0288187 A1 Oct. 5, 2017

(51) Int. Cl.
*H01M 2/12* (2006.01)
*H01M 2/10* (2006.01)

(52) U.S. Cl.
CPC ....... *H01M 2/1241* (2013.01); *H01M 2/1077* (2013.01); *H01M 2/1276* (2013.01); *H01M 2200/20* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 8,679,662 B2 | 3/2014 | Maguire et al. | |
| 2002/0081484 A1* | 6/2002 | Exnar | H01M 2/1235 429/56 |
| 2010/0215996 A1* | 8/2010 | Wendling | H01M 2/0413 429/54 |
| 2011/0311848 A1 | 12/2011 | Garascia et al. | |
| 2012/0244399 A1 | 9/2012 | Tartaglia | |
| 2014/0093751 A1* | 4/2014 | Schaefer | H01M 2/1072 429/7 |
| 2015/0030893 A1 | 1/2015 | Mack et al. | |
| 2016/0020447 A1 | 1/2016 | Janarthanam et al. | |

* cited by examiner

*Primary Examiner* — Wyatt P McConnell
(74) *Attorney, Agent, or Firm* — Carlson, Gaskey & Olds

(57) ABSTRACT

A battery pack according to an exemplary aspect of the present disclosure includes, among other things, an enclosure that houses at least one battery cell and a vent device comprised of a polymeric material and adapted to discharge battery vent byproducts vented by the battery cell to a location external to the enclosure while preventing ingress of environmental fluids into the enclosure.

20 Claims, 8 Drawing Sheets

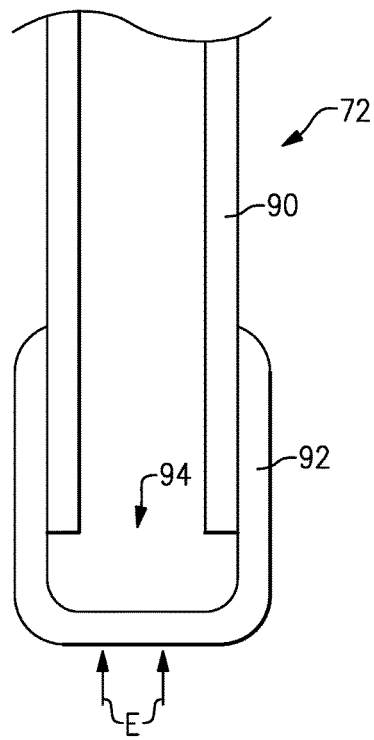
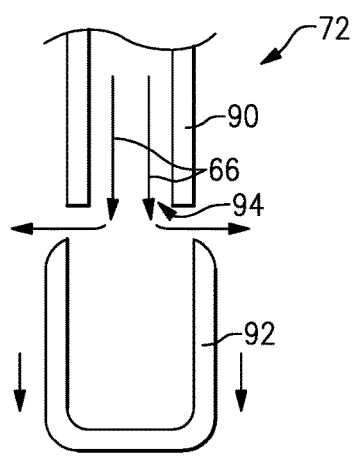
FIG.5A
FIG.5B
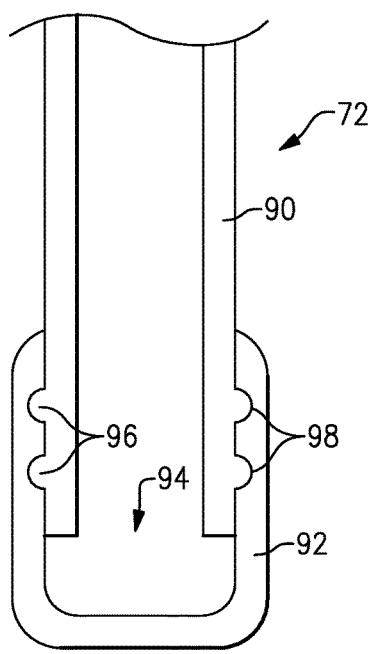
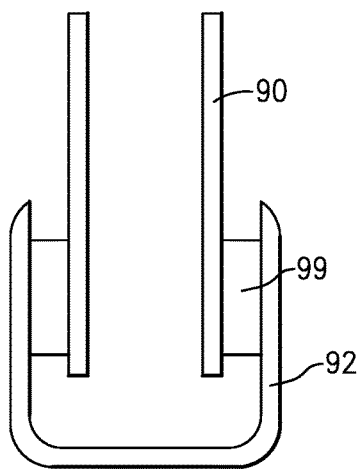
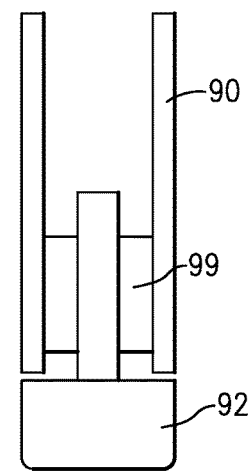
FIG.6A
FIG.6B
FIG.6C

US 10,312,490 B2

VENT DEVICES FOR ELECTRIFIED VEHICLE BATTERY PACKS

TECHNICAL FIELD

This disclosure relates to a battery pack of an electrified vehicle. A vent device of the battery pack establishes a flow path for discharging battery vent byproducts during battery cell venting events.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of interconnected battery cells that store energy for powering these electrical loads. Battery vent byproducts may be expelled from the battery cells during certain conditions. The battery vent byproducts may need purged from the battery pack when a venting event occurs.

SUMMARY

A battery pack according to an exemplary aspect of the present disclosure includes, among other things, an enclosure that houses at least one battery cell and a vent device comprised of a polymeric material and adapted to discharge battery vent byproducts vented by the battery cell to a location external to the enclosure while preventing ingress of environmental fluids into the enclosure.

In a further non-limiting embodiment of the foregoing battery pack, the vent device includes a vent tube and a removable cap received over the vent tube.

In a further non-limiting embodiment of either of the foregoing battery packs, the vent tube includes a barb received within a groove of the removable cap.

In a further non-limiting embodiment of any of the foregoing battery packs, the vent device includes a flap movable between a first position in which an outlet of the vent device is closed and a second position in which the outlet is open.

In a further non-limiting embodiment of any of the foregoing battery packs, the flap is part of a grommet of the vent device.

In a further non-limiting embodiment of any of the foregoing battery packs, the flap is part of a vent tube of the vent device.

In a further non-limiting embodiment of any of the foregoing battery packs, the vent device includes a predefined failure area configured to plastically deform in response to pressure build-up inside the vent device.

In a further non-limiting embodiment of any of the foregoing battery packs, the predefined failure area includes a notch formed in an outer surface of a vent tube.

In a further non-limiting embodiment of any of the foregoing battery packs, the vent device includes a vent tube having a closed end, a predefined failure area formed near the closed end, and an enlarged section disposed between the predefined failure area and the closed end.

In a further non-limiting embodiment of any of the foregoing battery packs, the vent device includes a vent tube, a bulb formed on an end of the vent tube, and a stress notch formed in the bulb.

In a further non-limiting embodiment of any of the foregoing battery packs, the vent device is mounted externally of the enclosure.

In a further non-limiting embodiment of any of the foregoing battery packs, the vent device is at least partially mounted inside the enclosure.

A battery pack according to another exemplary aspect of the present disclosure includes, among other things, a vent device including a flap this is movable between a first position and a second position to expose an outlet of the vent device if a pressure inside the vent device exceeds a threshold pressure.

In a further non-limiting embodiment of the foregoing battery pack, the flap is part of a grommet of the vent device.

In a further non-limiting embodiment of either of the foregoing battery packs, the flap is part of a vent tube of the vent device.

In a further non-limiting embodiment of any of the foregoing battery packs, the flap is connected to a base of the vent device by a hinge.

In a further non-limiting embodiment of any of the foregoing battery packs, battery vent byproducts are discharged from the vent device if the flap is in the second position and environmental elements are block from ingress into the vent device if the flap is in the first position.

A battery pack according to another exemplary aspect of the present disclosure includes, among other things, a vent device configured to plastically deform at a predefined failure area to expose an outlet of the vent device if a pressure inside the vent device exceeds a threshold pressure.

In a further non-limiting embodiment of the foregoing battery pack, the predefined failure area is a notch formed in an external surface of a tube.

In a further non-limiting embodiment of either of the foregoing battery packs, the predefined failure area is a stress notch formed in a bulb of the vent device.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 5A and 5B illustrate a vent device according to a first embodiment of this disclosure.

FIGS. 6A, 6B, and 6C illustrate a vent device according to additional embodiments of this disclosure.

DETAILED DESCRIPTION

This disclosure describes a battery pack for an electrified vehicle. The battery pack includes an enclosure and a vent device. The enclosure houses battery cells that may occasionally release battery vent byproducts. The vent device is configured to discharge the battery vent byproducts from the battery pack while blocking ingress of environmental elements, such as air, moisture and/or insects, into the battery pack. The vent device may include a cap, flap or other feature that seals against the external environment normally but opens as a function of internal pressures to release the battery vent byproducts. These and other features are discussed in greater detail in the following paragraphs of this detailed description.

Figure 1:
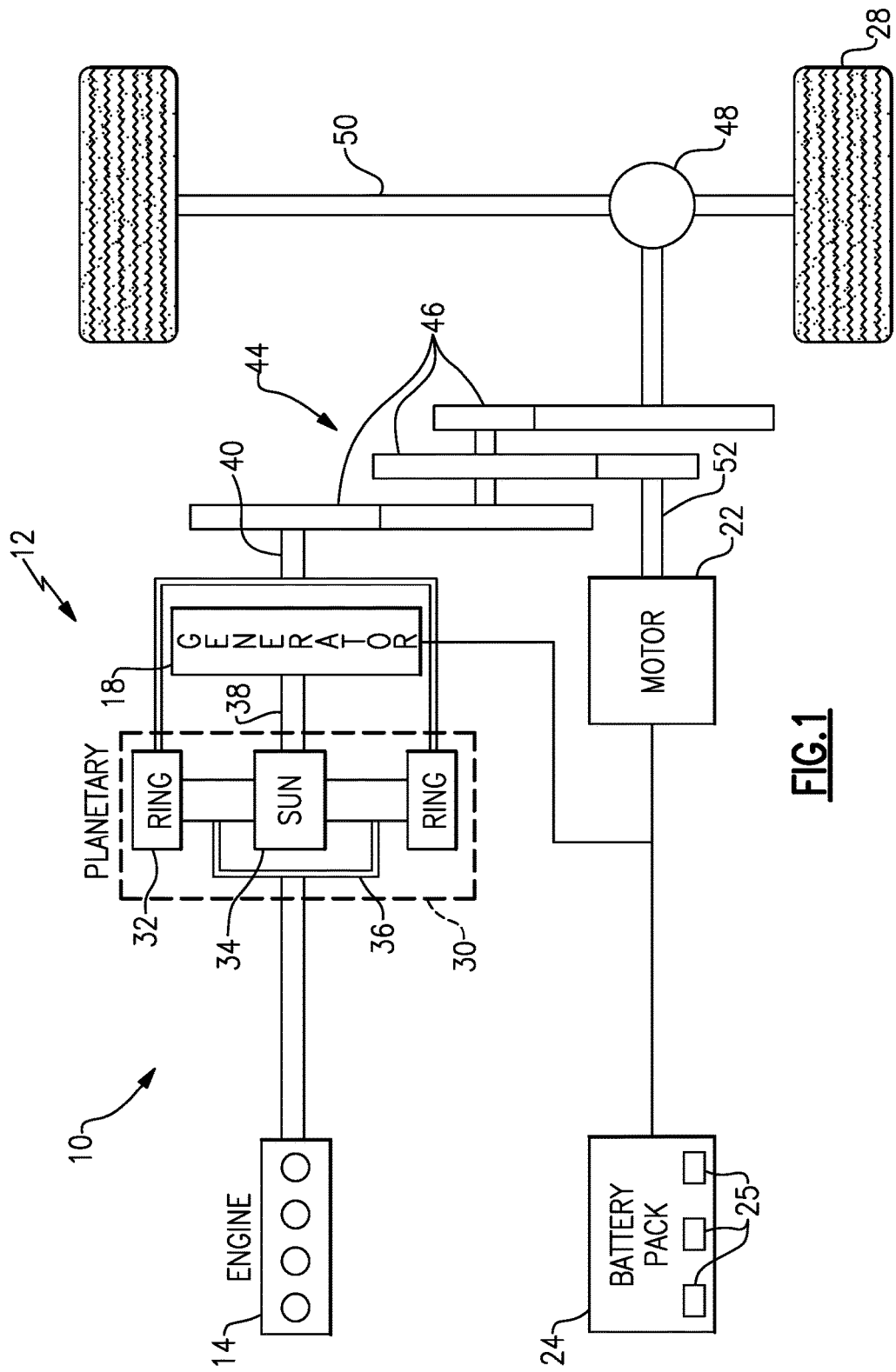
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
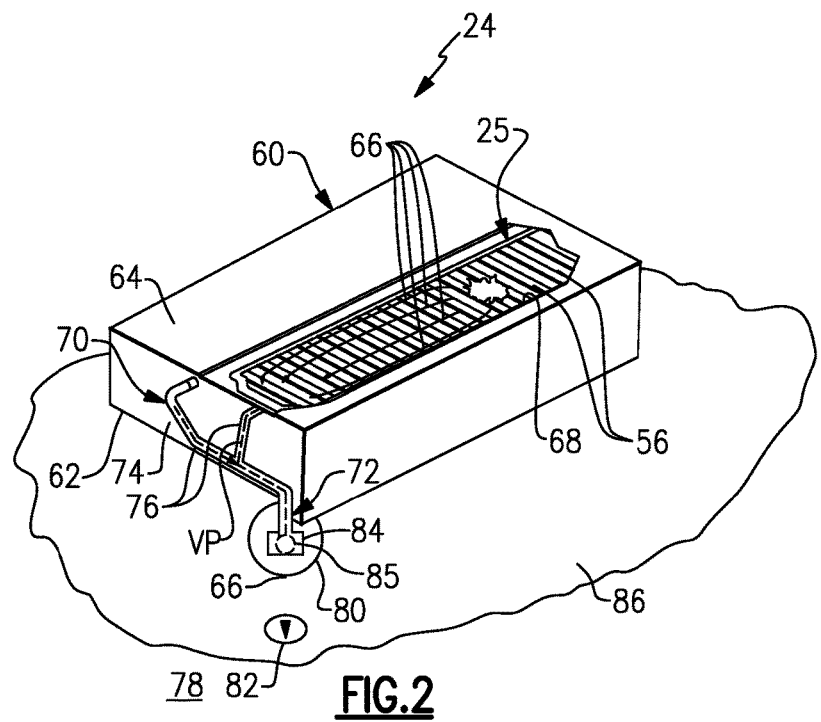
FIG. 2 illustrates a battery pack of an electrified vehicle.
Figure 3:
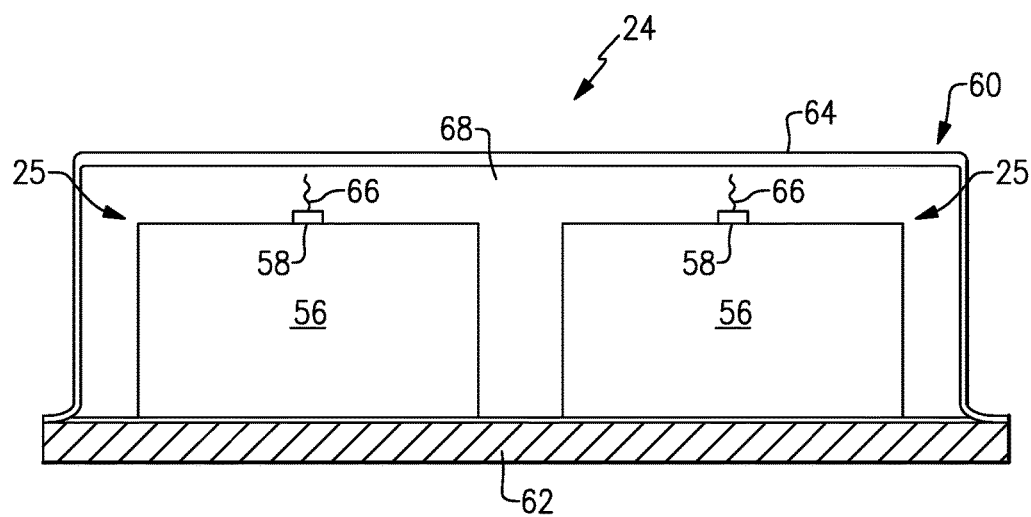
FIG. 3 illustrates a cross-sectional view of the battery pack of FIG. 2.

FIGS. 2 and 3 illustrate a battery pack 24 that can be employed within an electrified vehicle. For example, the battery pack 24 could be part of the electrified vehicle 12 of FIG. 1. The battery pack 24 includes a plurality of battery cells 56 that store electrical power for powering various electrical loads of the electrified vehicle 12. Although a specific number of battery cells 56 are depicted in FIG. 2, the battery pack 24 could employ a greater or fewer number of battery cells within the scope of this disclosure. In other words, this disclosure is not limited to the specific configuration shown in FIGS. 2 and 3.

The battery cells 56 may be stacked side-by-side along a longitudinal axis or on top of one another to construct groupings of battery cells 56, sometimes referred to as "cell stacks." The battery pack 24 can include one or more separate groupings of battery cells 56.

In one non-limiting embodiment, the battery cells 56 are prismatic, lithium-ion cells. However, battery cells having other geometries (cylindrical, pouch, etc.), other chemistries (nickel-metal hydride, lead-acid, etc.), or both, could alternatively be utilized within the scope of this disclosure.

The battery cells 56, along with any other support structures (e.g., spacers, rails, walls, plates, etc.), may be collectively referred to as a battery assembly 25. Two battery assemblies 25 are shown in FIG. 3; however, the battery pack 24 could include a greater or fewer number of battery assemblies within the scope of this disclosure.

An enclosure 60 generally surrounds each battery assembly 25 of the battery pack 24. In one non-limiting embodiment, the enclosure 60 includes a tray 62 and a cover 64. A portion of the cover 64 is shown removed in FIG. 2 to better illustrate the interior features of the battery pack 24. The cover 64 is attachable to the tray 62 in order to cover the battery assemblies 25. The tray 62 and cover 64 together establish the enclosure 60, which houses the various hardware and electronics of the battery pack 24, including but not limited to the battery assemblies 25. The cover 64 may be attached to the tray 62 in any known manner. In one non-limiting embodiment, the cover 64 is mechanically fastened to the tray 62 using one or more fasteners.

Each battery cell 56 may include one or more vents 58. The vents 58 expel battery vent byproducts 66, such as gases or other byproducts, from the battery cells 56 during certain battery cell venting events. For example, battery venting events may occur during over-temperature or over-charging conditions of the battery cells 56, or during other cell conditions.

The battery vent byproducts 66 vent into vent chambers 68 arranged inside the battery pack 24. The vent chambers 68 could simply be open spaces established between the battery assemblies 25 and the walls of the enclosure 60. A venting system 70 of the battery pack 24 is adapted to discharge the battery vent byproducts 66 from the interior of the battery pack 24 to a location external to the battery pack 24 while preventing environmental elements (e.g., air, moisture, insects, etc.) from entering the battery pack 24 through the venting system 70.

In one non-limiting embodiment, the venting system 70 includes one or more vent chambers 68 and a vent device 72. The venting system 70 establishes a venting path VP (shown in dashed lines) through the vent device 72 for expelling the battery vent byproducts 66 when a battery cell venting event occurs. For example, the battery vent byproducts 66 may flow, under their own motive pressure, through the vent chamber 68 and then through the vent device 72 prior to being expelled outside of the battery pack 24, such as to atmosphere 78 (i.e., outside the vehicle). The vent device 72 may include one or more vent tubes, grommets, ports, seals, or any combination of such components.

In one non-limiting embodiment, best shown in FIG. 2, the vent device 72 is mounted outside the enclosure 60. For example, portions of the vent device 72 may be mounted to a wall 74 of the battery pack 24. The wall 74 could be part of either the tray 62 or the cover 64 of the enclosure 60. The vent device 72 is mounted such that it is fluidly connected to the vent chamber(s) 68. The vent device 72 may include one or more branches 76 for connecting to multiple vent chambers 68. In another non-limiting embodiment, each branch 76 connects to a different vent chamber 68.

The vent device 72 permits the battery vent byproducts 66 to flow along the venting path VP out of the battery pack 24 to atmosphere 78. The vent device 72 may also block environmental elements from being communicated along a reverse path from atmosphere 78 into the vent chamber 68. Moisture/humidity of the atmospheric air, insects and other elements associated with the atmosphere 78 are undesirable inside the battery pack 24 and are therefore blocked from ingress by the vent device 72.

In the non-limiting embodiment of FIG. 2, a vehicle interface structure 80 extends from a portion of the enclosure 60 of the battery pack 24. The vehicle interface structure 80 may be part of the tray 62 or the cover 64, or could be a separate structure, such as a bracket, that is mounted to the tray 62 or the cover 64. The battery pack 24 is mounted to a vehicle structure 86 using the vehicle interface structure 80. In one non-limiting embodiment, the vehicle structure 86 is a floor pan having an aperture 82 that opens to the atmosphere 78, or to a location external to the electrified vehicle. Other structures may alternatively be employed as the vehicle structure 86.

A distal portion 84 (e.g., a tube outlet or grommet) of the vent device 72 is mounted to the vehicle interface structure 80. A vent aperture 85 is formed through the vehicle interface structure 80 and can accept a portion of the distal portion 84 of the vent device 72. Once the battery pack 24 is mounted, an outlet of the distal portion 84 of the vent device 72, the vent aperture 85 of the vehicle interface structure 80, and the aperture 82 of the vehicle structure 86 substantially align to further establish the venting path VP for discharging the battery vent byproducts 66 to the atmosphere 78.

Figure 4:
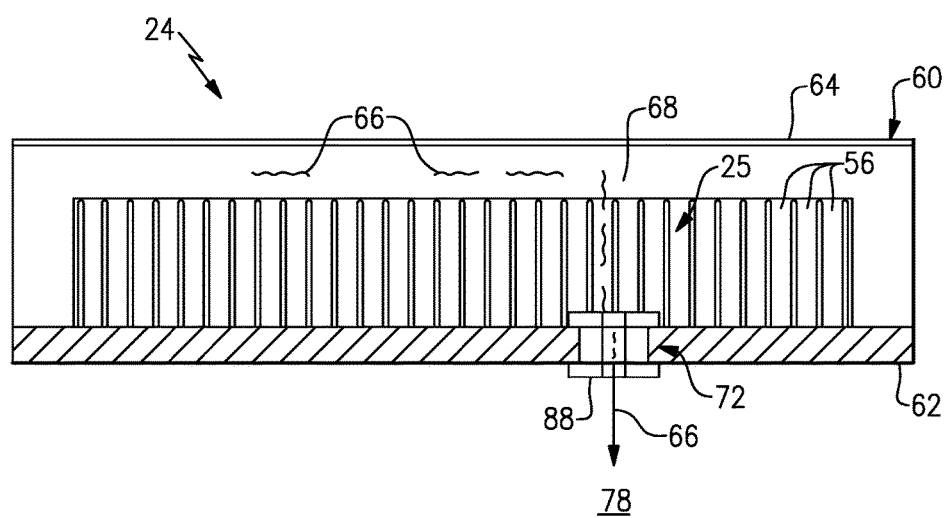
FIG. 4 illustrates another exemplary battery pack.

In another non-limiting embodiment, shown in FIG. 4, the vent device 72 is at least partially mounted inside the enclosure 60 of the battery pack 24. The vent device 72 of this embodiment is a grommet style device. The vent device 72 could extend through any wall of either the tray 62 or the cover 64 for expelling battery vent byproducts 66 from the battery pack 24. Because the vent device 72 of FIG. 4 is mounted inside the battery pack 24, tubing is not required to expel the battery vent byproducts 66 from the battery pack 24. An outlet 88 of the vent device 72 may be positioned at any location suitable to communicate the battery vent byproducts 66 to atmosphere 78. In this embodiment, the outlet 88 is positioned beneath the tray 62 of the battery pack 24.

The vent device 72 can embody a variety of designs and configurations. The particular design of the vent device 72 may depend on a specific vehicle application. Non-limiting embodiments of several vent devices are illustrated in FIGS. 5-11. In one non-limiting embodiment, each component of the vent devices illustrated in FIGS. 5-11 is made of plastic or polymeric materials and may be a molded part. Non-limiting examples of suitable plastic or polymeric materials include rubber, polypropylene, polyethylene, and polyamide.

FIGS. 5A and 5B illustrate a vent device 72 according to a first non-limiting embodiment. The vent device 72 embodies a two-piece design that includes a vent tube 90 and a cap 92 received over an outlet 94 of the vent tube 90. Although not shown in FIG. 5A or 5B, the vent tube 90 would be fluidly connected at one end to a vent chamber of a battery pack and the outlet 94 would open to the atmosphere at a location outside of the battery pack.

When connected to the vent tube 90, the cap 92 seals the outlet 94 against the ingress of environmental elements E (see FIG. 5A). The cap 92 is removable from the vent tube 90 to allow battery vent byproducts 66 to escape from the vent device 72 (see FIG. 5B). For example, in one non-limiting embodiment, the cap 92 is forced, or blown, off of the vent tube 90 as a function of a pressure build-up inside the vent device 72. The internal pressure build-up may occur during a battery venting event in which battery vent byproducts 66 accumulate near the outlet 94 of the vent tube 90.

In yet another non-limiting embodiment, shown in FIG. 6A, the vent tube 90 may include one or more barbs 96, or radial projections, that are received in grooves 98 formed in the cap 92. The barbs 96 increase the amount of pressure that is required to detach the cap 92 from the vent tube 90. Conversely, if the blow off pressure needs to be lowered, the cap 92 can be sized to have a clearance fit to the vent tube 90 (either outside the vent tube 90 (see FIG. 6B) or inside the vent tube 90 (see FIG. 6C)). A plug 99, such as a foam plug with an appropriate compressive spring force, can be included in the clearance between the cap 92 and vent tube 90 such that the plug 99 prevents the cap 92 from easily falling away while still holding the cap 92 in place with a lower force than one directly fit onto the vent tube 90.

Figure 7A:
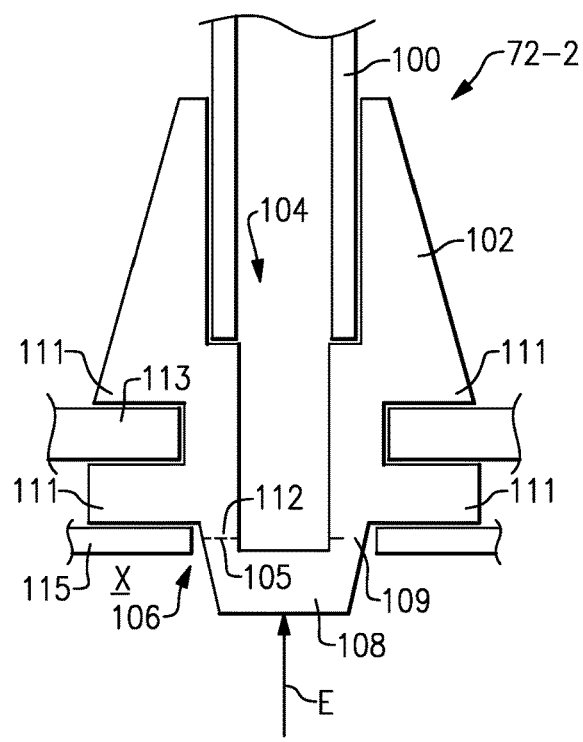
FIGS. 7A and 7B illustrate a vent device according to a third embodiment of this disclosure.
Figure 7B:
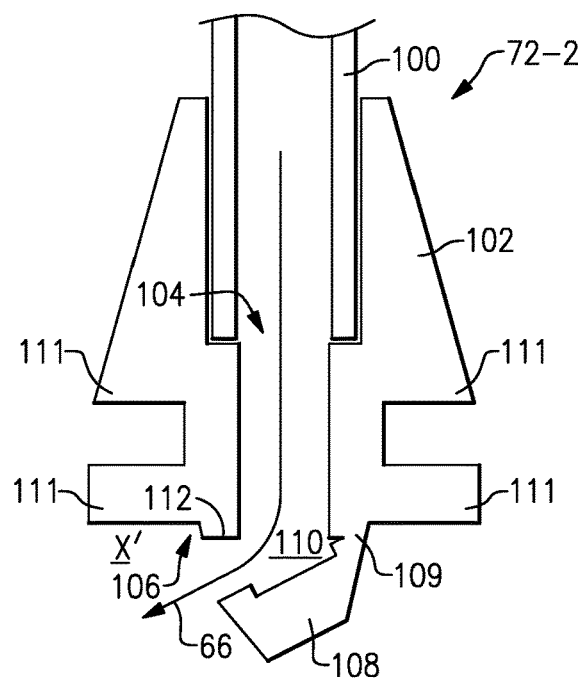

FIGS. 7A and 7B illustrate another exemplary vent device 72-2. The vent device 72-2 is another two-piece design and includes a vent tube 100 and a grommet 102 received over an outlet 104 of the vent tube 100. A base 106 of the grommet 102 is cut or slit along cut line 105 to form a flap 108. A portion of the base 106 is uncut to form a hinge 109 that connects the flap 108 to the base 106.

Integrally formed flanges 111 may protrude laterally from the grommet 102. The flanges 111 interface with and seal relative to a first structure 113 of a battery pack and a second structure 115 of a vehicle (see FIG. 7A). In one non-limiting embodiment, the first structure 113 is a portion of a battery pack enclosure and the second structure 115 is a floor pan of the vehicle.

The flap 108 of the grommet 102 is moveable to expel battery vent byproducts 66 through an outlet 110 of the grommet 102. For example, in a first position X, shown in FIG. 7A, the flap 108 lays flat against a seat 112 of the base 106 to cover the outlet 110. In the first position X, the flap 108 blocks environmental elements E from entering the vent device 72-2. Therefore, the vent device 72-2 prevents ingress of the environmental elements E into a battery pack through the vent tube 100. In a second position X', shown in FIG. 7B, the flap 108 has been moved away from the seat 112 by pressure created from the motive flow of the battery vent byproducts 66. Flow of the battery vent byproducts 66 displaces the flap 108 away from the seat 112 to expose the outlet 110 to atmosphere and allow the battery vent byproducts 66 to be expelled from a battery pack. The amount of pressure required to displace the flap 108 can be tuned to any specific design need.

Figure 8A:
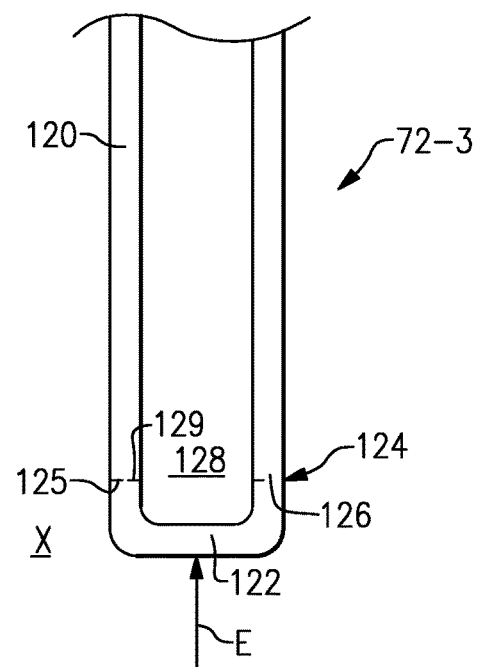
FIGS. 8A and 8B illustrate a vent device according to a fourth embodiment of this disclosure.
Figure 8B:
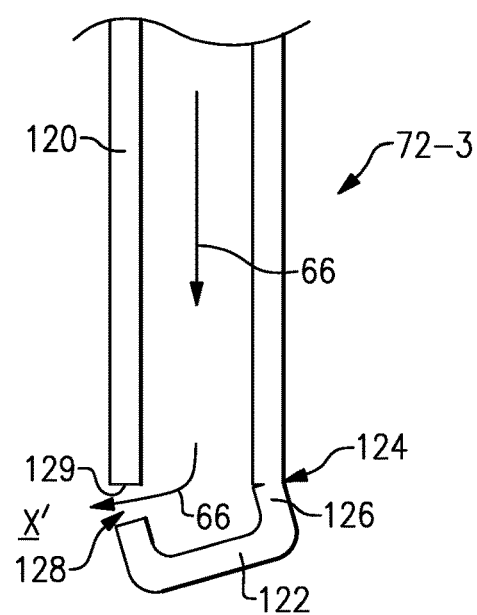

FIGS. 8A and 8B illustrate a vent device 72-3 embodying a single-piece design. The vent device 72-3 includes a vent tube 120. Instead of including a separate grommet, a flap 122 is incorporated into a distal portion 124 of the vent tube 120. The distal portion 124 is cut or slit along cut line 125 to form the flap 122. A portion of the distal portion 124 is left uncut to form a hinge 126 that connects the flap 122 to the distal portion 124 of the vent tube 120.

The flap 122 of the vent tube 120 is moveable to expel battery vent byproducts 66 through an outlet 128. For example, in a first position X, shown in FIG. 8A, the flap 122 lays flat against a seat 129 of the distal portion 124 to cover the outlet 128. In the first position X, the flap 122 blocks environmental elements E from entering the vent device 72-3. Therefore, the vent device 72-3 prevents ingress of the environmental elements E into a battery pack through the vent tube 120. In a second position X', shown in FIG. 8B, the flap 122 is moved away from the seat 129 by pressure created by the motive flow of the battery vent byproducts 66. Flow of the battery vent byproducts 66 displaces the flap 122 away from the seat 129 to expose the outlet 128 to atmosphere and allow the battery vent byproducts 66 to be expelled from the battery pack.

Figure 9:
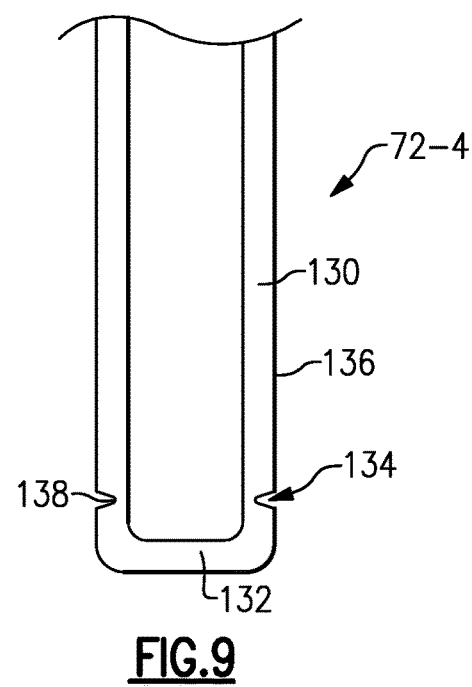
FIG. 9 illustrates a vent device according to another embodiment of this disclosure.

FIG. 9 illustrates yet another vent device 72-4. The vent device 72-4 includes a vent tube 130 having a closed end 132. The vent tube 130 includes a predefined failure area 134 near the closed end 132. The predefined failure area 134 may be formed in an outer surface 136 of the vent tube 130 by scoring or cutting a shallow groove 138 into the outer surface 136. The predefined failure area 134 creates a weakened point in the vent tube 130. The vent tube 130 can plastically deform or rupture at the predefined failure area 134 if the pressure inside the vent tube 130 exceeds a threshold pressure. Battery vent byproducts may be discharged through an outlet of the vent tube 130 after plastic deformation occurs at the predefined failure area 134.

Figure 10:
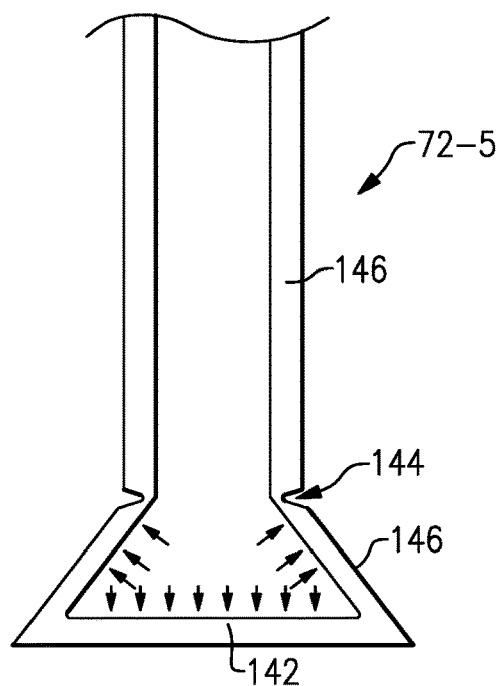
FIG. 10 illustrates a vent device according to another embodiment of this disclosure.

The vent device 72-5 of FIG. 10 is similar to the vent device 72-4 of FIG. 9. However, in this embodiment, the vent device 72-5 includes a vent tube 140 having a closed end 142, a predefined failure area 144 formed near the closed end 142, and an enlarged section 146 disposed between the predefined failure area 144 and the closed end 142. The enlarged section 146 increases the surface area of the vent tube 140 below the predefined failure area 144. The increased surface area enhances the resultant force developed on the distal end of the vent tube 140 and thus promotes more or faster plastic deformation at the predefined failure area 144.

Figure 11:
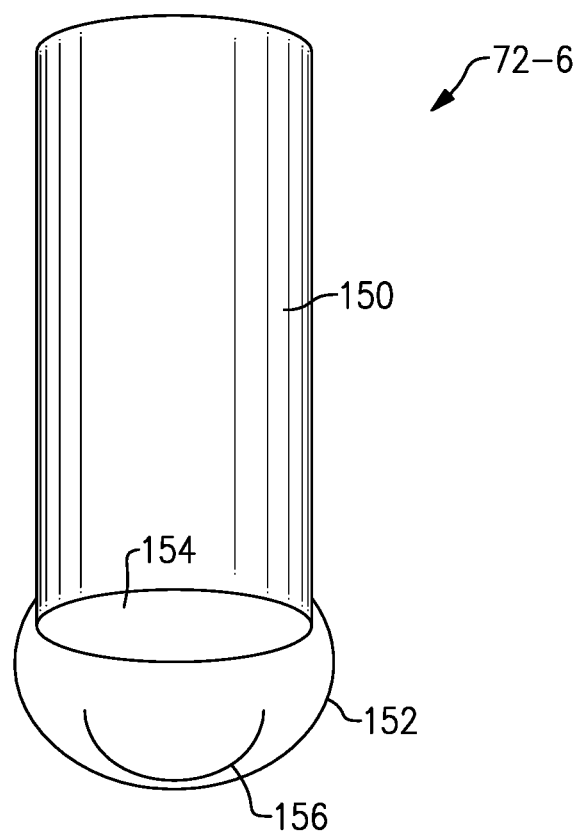
FIG. 11 illustrates a vent device according to yet another embodiment of this disclosure.

FIG. 11 illustrates a vent device 72-6 according to yet another non-limiting embodiment of this disclosure. The vent device 72-6 include a vent tube 150 and a bulb 152 formed on an end of the vent tube 150 to conceal an outlet 154 of the vent tube 150. In one non-limiting embodiment, the bulb 152 is a partial sphere that is blow molded onto an end of the vent tube 150. A stress notch 156 (or multiple interesting stress notches in an X or star pattern, for example) may be formed in the bulb 152. The vent tube 150 can plastically deform or rupture at the stress notch 156 if the pressure inside the vent tube 150 exceeds a threshold pressure, thereby severing the bulb 152 into multiple flaps and thus exposing the outlet 154 to atmosphere. Battery vent byproducts may be discharged from the vent tube 150 through the outlet 154 after plastic deformation occurs at the stress notch 156.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
an enclosure that houses a plurality of battery cells; and
a vent device comprised of a polymeric material and adapted to discharge battery vent byproducts vented by said battery cells to a location external to said enclosure while preventing ingress of environmental fluids into said enclosure,
wherein said vent device is non-contiguous with a housing of any of said battery cells.

2. The battery pack as recited in claim 1, wherein said vent device includes a vent tube and a removable cap received over said vent tube.

3. A battery pack, comprising:
an enclosure that houses at least one battery cell; and
a vent device comprised of a polymeric material and adapted to discharge battery vent byproducts vented by said battery cell to a location external to said enclosure while preventing ingress of environmental fluids into said enclosure,
wherein said vent device is separate and remote from said battery cell,
wherein said vent device includes a vent tube and a removable cap received over said vent tube, and said vent tube includes a barb received within a groove of said removable cap.

4. The battery pack as recited in claim 1, wherein said vent device includes a flap movable between a first position in which an outlet of said vent device is closed and a second position in which said outlet is open.

5. The battery pack as recited in claim 4, wherein said flap is part of a grommet of said vent device.

6. The battery pack as recited in claim 4, wherein said flap is part of a vent tube of said vent device.

7. The battery pack as recited in claim 1, wherein said vent device includes a predefined failure area configured to plastically deform in response to pressure build-up inside said vent device.

8. The battery pack as recited in claim 7, wherein said predefined failure area includes a notch formed in an outer surface of a vent tube.

9. The battery pack as recited in claim 1, wherein said vent device includes a vent tube having a closed end, a predefined failure area formed adjacent to said closed end, and an enlarged section that is enlarged compared to a remainder of said vent tube, said enlarged section disposed between said predefined failure area and said closed end.

10. The battery pack as recited in claim 1, wherein said vent device includes a vent tube, a bulb formed on an end of said vent tube, and a stress notch formed in said bulb.

11. The battery pack as recited in claim 1, wherein said vent device is mounted externally of said enclosure.

12. The battery pack as recited in claim 1, wherein said vent device is at least partially mounted inside the enclosure.

13. A battery pack, comprising:
an enclosure;
a plurality of battery cells housed inside said enclosure;
a vent device extending through said enclosure and including a flap that is movable between a first position and a second position to expose an outlet of said vent device if a pressure inside said vent device exceeds a threshold pressure,
wherein said enclosure is separate from a housing of any of said battery cells.

14. A battery pack, comprising:
a vent device including a flap that is movable between a first position and a second position to expose an outlet of said vent device if a pressure inside said vent device exceeds a threshold pressure,
wherein said flap is part of a grommet of said vent device.

15. The battery pack as recited in claim 13, wherein said flap is part of a vent tube of said vent device.

16. The battery pack as recited in claim 13, wherein said flap is connected to a base of said vent device by a hinge.

17. The battery pack as recited in claim 13, wherein battery vent byproducts are discharged from said vent device if said flap is in said second position and environmental elements are block from ingress into said vent device if said flap is in said first position.

18. A battery pack, comprising:
a vent device configured to plastically deform at a predefined failure area to expose an outlet of said vent device if a pressure inside said vent device exceeds a threshold pressure,
wherein said vent device is non-contiguous with a housing of any battery cell housed inside the battery pack.

19. The battery pack as recited in claim 18, wherein said predefined failure area is a notch formed in an external surface of a tube.

20. The battery pack as recited in claim 18, wherein said predefined failure area is a stress notch formed in a bulb of said vent device.

* * * * *